No. 885,714. PATENTED APR. 28, 1908.
I. G. BERRY.
SELF FEEDING DEVICE.
APPLICATION FILED AUG. 13, 1903. RENEWED SEPT. 7, 1907.
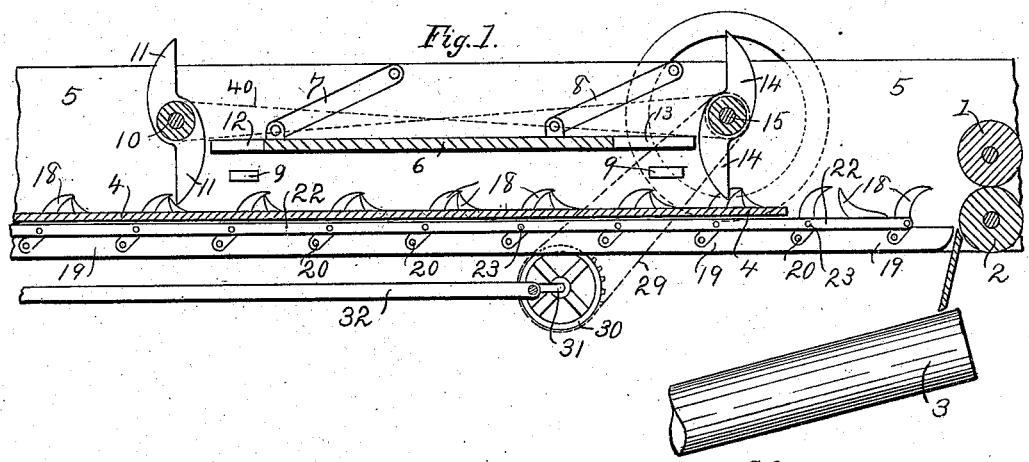
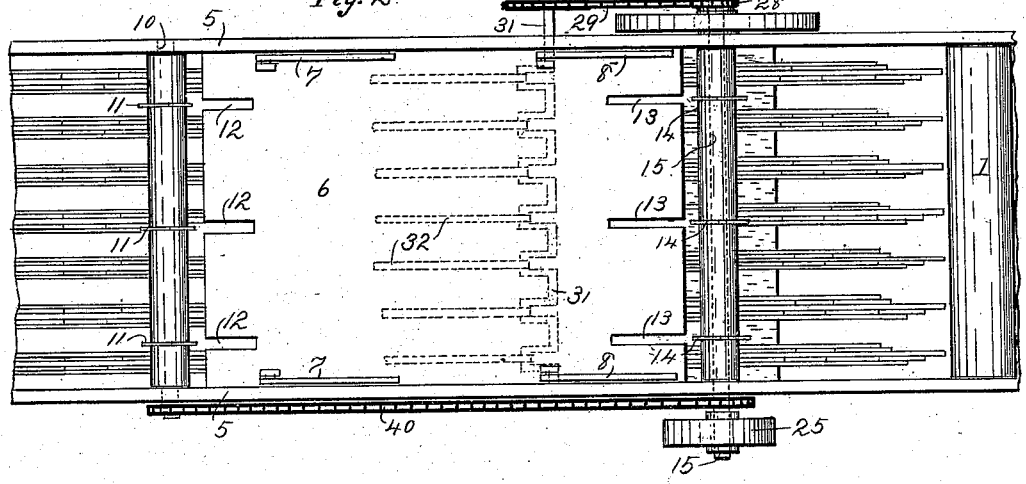
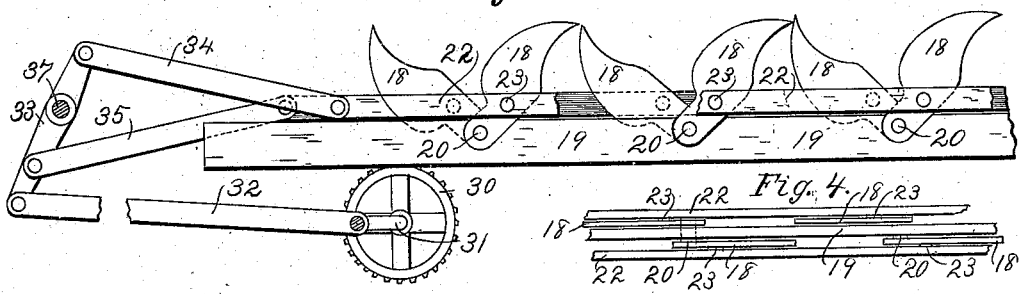
WITNESSES:
INVENTOR.
BY
ATTORNEYS

UNITED STATES PATENT OFFICE.

IRA G. BERRY, OF MADISON, WISCONSIN, ASSIGNOR, BY MESNE ASSIGNMENTS, TO J. I. CASE THRESHING MACHINE COMPANY, OF RACINE, WISCONSIN, A CORPORATION.

SELF-FEEDING DEVICE.

No. 885,714.        Specification of Letters Patent.        Patented April 28, 1908.

Application filed August 13, 1903, Serial No. 169,325. Renewed September 7, 1907. Serial No. 391,883.

*To all whom it may concern:*

Be it known that I, IRA G. BERRY, a citizen of the United States, residing at Madison, county of Dane, and State of Wisconsin, have invented new and useful Improvements in Self-Feeding Devices, of which the following is a specification.

My invention relates to improvements in self feeding devices, designed especially for use in connection with corn husking machines.

The object of my invention is to provide improved mechanism for feeding the stalks and for controlling the feed, whereby the stalks are kept from clogging the snapping rollers.

In the following description, reference is had to the accompanying drawings in which Figure 1 is a longitudinal sectional view of my improved feeder. Fig. 2 is a plan view of the same, showing the governor in section. Fig. 3 is a detail view of the rear portion of the feeder, showing the mechanism for operating the reciprocating bars. Fig. 4 is a detail plan view of the connections for actuating the reciprocating conveyer teeth.

Like parts are identified by the same reference characters throughout the several views.

1 and 2 are the snapping rollers and 3 are the husking rollers of a corn husking machine. 4 is the floor of the conveyer trough, and 5 are the sides thereof. A floating platform 6 is located within the conveyer trough and connected with the sides by parallel links 7 and 8, whereby the platform may be lifted by the material. Stops 9, however, are used to limit the downward movement of the links 7 and 8 and the platform. The front end of the platform extends into proximity to a shaft 10 which carries band-cutting blades 11, the latter operating through slots 12 in the platform. The rear end of the platform is similarly slotted at 13 to permit rotation of a set of blades 14 which are mounted upon the shaft 15 and rotated in a direction opposite that of the band-cutting blades 11. The band-cutting blades 11 operate in the stalks in the direction of the feed, while the band-cutting blades 14 operate in the stalks contrary to the line of feed. The stalks are fed forwardly by means of teeth 18, which are arranged in sets, the teeth of each set being separately connected with a common supporting bar 19 by pivot pins or bolts 20. The teeth of each set are oscillated upon their pivots 20 by means of an actuating bar 22 which is also pivotally connected with each tooth by pivot bolts 23, above the line of pivots 20. Each of the bars 19 is preferably provided with two sets of stalk advancing teeth 18, the teeth of the respective sets being connected with the bar 19 by the same pivot pins or bolts, but located on opposite sides of the bar, and the actuating bars 22 of one set are reciprocated in alternation with the actuating bar of the other set, whereby the teeth of the respective sets are made to move in alternation. The platform 4 is suitably slotted, and the teeth 18 project upwardly through the slots, the latter being sufficiently long to permit the teeth to oscillate. With this construction, the stalks are advanced and held by one set of teeth pending the retraction and engagement of the teeth of the other set connected with the same bar 19, the teeth of the last mentioned set then moving to advance the stalks pending the retraction of those of the first mentioned set.

Referring to Fig. 3, it will be observed that a number of bars 19 are provided, each having two sets of alternately moving stalk advancing teeth, as above described, thus forming a continuous conveyer for advancing the stalks to the snapping rollers. Motion is communicated from the source of power to the shaft 15 through the medium of a pulley 25. From the shaft 15, motion is communicated through the medium of an ordinary clutch governor 26 to the loose clutch pulley *d*, from which the motion is transmitted to the tooth actuating bars 22 of the feeder through the medium of the sprocket wheel 28, chain 29, sprocket wheel 30, crank shaft 31, connecting rods 32, levers 33 and links 34 and 35. The levers 33 are pivotally secured to the rear end of the feeder frame by a rod 37, and the links 34 and 35 are connected with the lever on opposite sides of this pivot rod. Each of the links 34 is connected with a bar 22 operating one set of teeth 18, while the links 35 are connected with bars 22 operating the alternate sets of conveyer teeth. The shaft 10 of the band-cutting blades is driven from the shaft 15 through the medium of a sprocket chain or crossed belt 40 and the usual sprocket wheels or pulleys.

It will be observed that with the above described motion transmitting connections, the operation of the feeder is not made dependent on the speed of the snapping rollers, but depends entirely upon the speed of the shaft 15. For this reason, no quantity of stalks upon the conveyer will serve to check the speed of the snapping or husking rollers, the surplus stalks merely operating to check the speed of the shaft 15 and blades 18, whereupon the clutch mechanism of the governor 26 becomes released by the operation of the governing weights, and the conveyer ceases to move until the requisite speed of shaft 15 is regained sufficiently to reëngage the governor clutch. The conveyer will, therefore, be alternately stopped and started in short movements, or made to move slowly with a slipping governor clutch until the surplus stalks are disposed of.

The governor clutch is of ordinary construction. A pulley $a$, fast on the shaft 15, is provided with radially movable friction clutches $b$, controlled by governing weights $c$, which weights are operated by centrifugal force to press the friction shoe into forcible contact with the rim of a loose pulley $d$, as shown in Fig. 2. These parts being of ordinary construction, it is unnecessary to describe them more specifically.

Any ordinary form of centrifugal governor may be used for this purpose and no importance therefore, is attached to the construction of the governor itself, the important feature of my construction in this connection being that the conveyer is driven from the loose pulley $d$ of the governor, whereby the conveyer stops feeding stalks as soon as the speed slackens, while the knives 11 and 14 will continue to operate until the clog is relieved, whereupon the conveyer will again be started, and I attach great importance to this feature. It is customary in feeders as ordinarily constructed, to so connect the governor that the entire feeding mechanism is stopped when the speed slackens sufficiently to release the governor clutches and it is therefore necessary for the attendant to manually remove the clog, while with the construction above described, the rotating knives separate the clogged stalks reached by them, whereupon the speed increases until the conveyer is started and if the clog is not entirely removed, the remaining portion is brought in reach of the knives and the conveyer again stops until the knives have again separated the stalks reached by them.

Having thus described my invention, what I claim as new and desire to secure by Letters Patent is,—

1. In a device of the described class, the combination with a conveyer, of a set of band-cutting knives mounted upon a shaft, extending transversely of the conveyer and operative in the material carried by the conveyer in the direction of the line of feed; a second set of knives, mounted upon a shaft in the rear of the first mentioned set and operating in the opposite direction; a platform, movably supported between said sets of knives, and adapted to be lifted vertically by the material carried by the conveyer; and means for driving the respective sets of knives in opposite directions.

2. In a device of the described class, the combination with a conveyer, of a set of band-cutting knives mounted upon a shaft extending transversely of the conveyer and operative in the material carried by the conveyer in the direction of the line of feed; a second set of knives, mounted upon a shaft in the rear of the first mentioned set and operating in the opposite direction; a platform, movably supported between said sets of knives, and adapted to be lifted vertically by the material carried by the conveyer; said platform being connected with the conveyer frame by diagonally extending parallel links; and means for driving the respective sets of knives in opposite directions.

3. In a device of the described class, the combination with a slotted conveyer platform, of a series of supporting bars located underneath said platform; a series of teeth, pivotally connected with each of said bars and projecting through said slots above the platform; a series of actuating bars, pivotally connected with said teeth; and means for communicating motion to the actuating bars.

4. In a device of the described class, the combination with a slotted conveyer platform, of a series of supporting bars located underneath said platform; a series of teeth, pivotally connected with each of said bars and projecting through said slots above the platform; a series of actuating bars, pivotally connected with said teeth; and means for communicating motion to the actuating bars in alternation.

5. In a device of the described class, the combination with a conveyer platform; a series of conveyer teeth, pivotally connected with a suitable support underneath the platform and projecting through suitable apertures in the platform; operating bars, each having pivotal connection with a longitudinal set or row of said teeth; and means for reciprocating the bars in alternation, said teeth being curved at their upper ends in the direction of the line of feed.

6. In a device of the described class, the combination of a set of supporting bars; a row of teeth, pivotally connected with each side of each such bar; a set of actuating bars, each pivotally connected with an individual tooth of a row; an actuating lever, connected with the source of power; and links, connected with said lever on opposite sides of its fulcrum, and also connected with adjacent tooth actuating bars.

7. In a husking machine, the combination with the snapping and husking rolls, of a conveyer platform spaced apart from said snapping rolls to form a throat between it and the snapping rolls and above the husking rolls, of a series of fixed bars bridging the throat between said conveyer platform and said snapping rolls, said bars being spaced apart to permit the detached ears to drop between them onto the husking rolls, a series of stalk advancing teeth mounted on said fixed bars and means for operating said teeth.

8. In a husking machine, the combination with the snapping and husking rolls, of a conveyer platform spaced apart from said snapping rolls to form a throat between it and the snapping rolls and above the husking rolls, of a series of fixed bars bridging the throat between said conveyer platform and said snapping rolls, said bars being spaced apart to permit the detached ears to drop between them onto the husking rolls, two sets of oscillating stalk advancing teeth mounted on each of said bars and means for driving the respective sets in opposite directions.

In testimony whereof I affix my signature in the presence of two witnesses.

IRA G. BERRY.

Witnesses:
 JOHN A. AYLWARD,
 W. W. COLLINS.